US012674018B2

(12) United States Patent
Murray et al.

(10) Patent No.: US 12,674,018 B2
(45) Date of Patent: Jul. 7, 2026

(54) TAPE COMPRISING A HYBRID BINDER FOR HIGH VOLTAGE APPLICATION

(71) Applicants: Elantas North America, Inc., St. Louis, MO (US); ELANTAS EUROPE S.R.L., Collecchio (IT)

(72) Inventors: Thomas James Murray, Wesel (DE); Ronald Goetter, Wesel (DE); Nathan Hussey, Wesel (DE); Mattia Ferraris, Wesel (DE); Paola Gherardi, Wesel (DE); Nicola Cuminetti, Wesel (DE); Marco Viola, Wesel (DE); David Vines, Wesel (DE)

(73) Assignees: ELANTAS NORTH AMERICA, INC., St. Louis, MO (US); ELANTAS EUROPE S.R.L., Collecchio (IT)

( * ) Notice: Subject to any disclaimer, the term of this patent is extended or adjusted under 35 U.S.C. 154(b) by 773 days.

(21) Appl. No.: 17/281,890

(22) PCT Filed: Oct. 4, 2019

(86) PCT No.: PCT/EP2019/076886
§ 371 (c)(1),
(2) Date: Mar. 31, 2021

(87) PCT Pub. No.: WO2020/070274
PCT Pub. Date: Apr. 9, 2020

(65) Prior Publication Data

US 2021/0395440 A1 Dec. 23, 2021

(30) Foreign Application Priority Data

Oct. 5, 2018 (EP) .................................... 18198970

(51) Int. Cl.

| | |
|---|---|
| ***C08G 59/17*** | (2006.01) |
| ***C03C 25/1095*** | (2018.01) |
| ***C03C 25/36*** | (2006.01) |
| ***C09D 163/10*** | (2006.01) |
| ***H01B 3/40*** | (2006.01) |

(52) U.S. Cl.
CPC ...... *C08G 59/1466* (2013.01); *C03C 25/1095* (2013.01); *C03C 25/36* (2013.01); *C09D 163/10* (2013.01); *H01B 3/40* (2013.01)

(58) Field of Classification Search
CPC . C08G 59/1466; C03C 25/1095; C03C 25/36; C09D 163/10; H01B 3/40
See application file for complete search history.

(56) References Cited

U.S. PATENT DOCUMENTS

| | | | | |
|---|---|---|---|---|
| 4,803,115 | A | 2/1989 | Fushiki | |
| 4,954,304 | A | 9/1990 | Ohtake | |
| 5,032,453 | A * | 7/1991 | Rogler | H01F 27/327 428/324 |
| 6,555,023 | B2 | 4/2003 | Smith | |
| 6,680,119 | B2 | 1/2004 | Smith | |
| 8,586,679 | B2 | 11/2013 | Klein Nagelvoort | |
| 2003/0044605 | A1* | 3/2003 | Smith | C08G 59/304 428/375 |
| 2003/0153718 | A1 | 8/2003 | Crump | |
| 2007/0218305 | A1 | 9/2007 | Ishigaki | |
| 2007/0252449 | A1 | 11/2007 | Ikeda | |
| 2009/0205856 | A1 | 8/2009 | Ishii | |
| 2009/0267535 | A1 | 10/2009 | Ashikaga | |
| 2012/0259039 | A1 | 10/2012 | Kobayashi | |
| 2013/0147307 | A1* | 6/2013 | Morooka | C09J 151/08 174/209 |
| 2014/0147639 | A1 | 5/2014 | Moon | |
| 2015/0252124 | A1 | 9/2015 | Gaefke | |
| 2015/0306790 | A1 | 10/2015 | Spyrou | |
| 2021/0009748 | A1* | 1/2021 | Liu | C08G 59/1466 |

FOREIGN PATENT DOCUMENTS

| | | | |
|---|---|---|---|
| CN | 1819408 | 8/2006 | |
| CN | 108164686 | 6/2018 | |
| CN | 108164686 A * | 6/2018 | C08G 59/145 |
| JP | 2003076008 | 3/2003 | |
| KR | 100941903 | 2/2010 | |
| WO | 2020070271 | 4/2020 | |

OTHER PUBLICATIONS

Arkema; "GPS Safety Summary Substance Name: Trimethylolpropane Triacrylate", 2013, pp. 1-6.

International Patent Application No. PCT/EP2019/076886, International Search Report and Written Opinion, dated Jan. 27, 2020, 12 pages.

Mao, T.J., et al., "Photopolymerization Initiated by Triphenylphosphine", Journal of Polymer Science: Part A-1, vol. 5, 1967, pp. 1741-1751.

* cited by examiner

*Primary Examiner* — Samir Shah
(74) *Attorney, Agent, or Firm* — Fitch, Even, Tabin & Flannery LLP

(57) ABSTRACT

The present invention relates to a tape comprising an epoxy based resin having ester groups and ethylenically unsaturated groups, alternatively a hybrid resin. The tape of the invention can be used for insulation in electrical machines, especially in high voltage machines. Preferably, the tape of the invention is used in combination with a composition for impregnating and/or coating a substrate comprising the tape of the invention, wherein the composition further comprises a second epoxy based resin having ester groups and ethylenically unsaturated groups, also an hybrid resin, a diluent and an initiator for a radical polymerization.

16 Claims, No Drawings

TAPE COMPRISING A HYBRID BINDER FOR HIGH VOLTAGE APPLICATION

The present invention relates to a tape comprising an epoxy based resin having ester groups and ethylenically unsaturated groups, alternatively called a hybrid binder. The tape of the invention can be used for insulation in electrical machines, especially in high voltage machines. Preferably, the tape of the invention is used in combination with a composition for impregnating and/or coating a substrate, such as an electrical conductor, comprising the tape of the invention, wherein the composition further comprises a second epoxy based resin having ester groups and ethylenically unsaturated groups, also a hybrid resin, a diluent and an initiator for a radical polymerization.

BACKGROUND OF THE INVENTION

The present invention relates to a tape used as insulator in electric machines, such as rotating and non-rotating electric machines.

In electric machines, especially those subject to high voltage, insulating materials for the coils are extremely important for their performance and lifespan.

Common insulating materials are organic polymers, which thermal, electrical, chemical and mechanical resistances are key requirements for obtaining a long-term performance of the machines.

US 2012/0259039 discloses a resin composition for a fibre-reinforced composite material comprising an epoxy resin, an acid group-containing radical polymerizable monomer, such as acylic or methacrylic acid and an amine-based curing agent for an epoxy resin.

US 2015/0306790 discloses a process for producing storage-stable epoxy prepregs and composites produced by this process using at least one reactive resin having at least one acid group and at least one epoxy-based reactive resin component, wherein one or both of the reactive resins comprises a group capable of free-radical polymerization.

U.S. Pat. Nos. 6,555,023 and 6,680,119 disclose an insulated electrical coil, which insulation is formed from a cured resinous composition of epoxy-anhydride resin that has been prereacted with an antioxidant oligomer selected from the group consisting of organophosphorous compounds, phenolics, thio-esters, thio-phosphites, thiazoles, lactones, hydroxylamines and maleimides.

Epoxy resins, generally cured with anhydride, are used as a standard in tapes to bond different layers of a tape. However, anhydride as a curing agent is moisture sensitive, which is a disadvantage during the handling of these kind of materials.

Thus, there is the need for new tapes for use in the isolation of substrates to be used in electric machines.

These problems are solved from the tape of the invention.

The tape of the invention has the advantage to be processed in the presence of moisture.

In a first embodiment, the invention relates to a tape comprising mica, a solid support and a resin component Z comprising:

i. One or more, the same or different, groups of formula

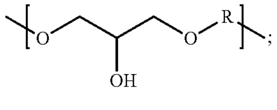

wherein R is an organic group comprising 2 to 40 carbon atoms; and ii. One or more groups comprising one ester group and one ethylenically unsaturated group.

In another embodiment, the invention relates to a tape comprising mica, a solid support and a resin component Z comprising:

i. One or more, the same or different, groups of formula

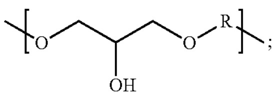

wherein R is an organic group comprising 2 to 40 carbon atoms; and ii. One or more groups comprising one ester group and one ethylenically unsaturated group;

wherein the resin component Z has an acid value of not more than 60 mgKOH/g.

In another preferred embodiment, the resin component Z preferably consists essentially of i. One or more, the same or different, groups of formula

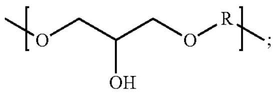

wherein R is an organic group comprising 2 to 40 carbon atoms ii. One or more groups comprising one ester group and one ethylenically unsaturated group.

The resin component Z has the function to bond mica and a solid support, which can be also present in the tape as different layers. The resin component Z can also be indicated as binder or hybrid binder within the meaning of this invention. In a preferred embodiment, the resin component Z of the tape of the invention further comprises one or more groups comprising two ester groups and one ethylenically unsaturated group (iii).

In the case of chemical compounds or compositions, the use of "consisting essentially of" or "comprising substantially" means that specific further components can be present, namely those not materially affecting the essential characteristics of the compound or composition.

In some embodiments, the resin component Z consists of 90% by weight, preferably 95% by weight, more preferably 98% by weight of the groups i), ii) and iii) present in the resin component Z calculated on the total weight of the resin component Z.

In some embodiments, the resin component Z consists essentially of i. One or more, the same or different, groups of formula

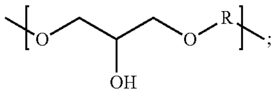

wherein R is an organic group comprising 2 to 40 carbon atoms ii. One or more groups comprising one ester group and one ethylenically unsaturated group;

iii. one or more groups comprising two ester groups and one ethylenically unsaturated group.

In some embodiments, the resin component Z consists of 90% by weight, preferably 95% by weight, more preferably 98% by weight of the groups i) and ii) present in the resin component Z calculated on the total weight of the resin component Z.

In some embodiments, the resin component Z consists of i. One or more, the same or different, groups of formula

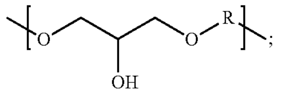

wherein R is an organic group comprising 2 to 40 carbon atoms ii. One or more groups comprising one ester group and one ethylenically unsaturated group.

Within the meaning of this invention, R is an organic group comprising 2 to 40 carbon atoms, wherein the organic group comprises an aromatic group, an aliphatic group, a heteroaromatic group, a heteroaliphatic group or mixtures thereof. The aliphatic group can be linear, branched, cyclic or mixtures thereof.

In a further preferred embodiment, R comprises the hydrocarbon part of a bisphenol A or bisphenol F unit.

The definition of the group R holds true for the resin Z used in the tape and for the resin A used in the composition for impregnating and/or coating a substrate.

Within the meaning of the invention, the brackets [] indicate the attachment point of the group indicated within the brackets to the rest of the molecule.

Preferably, the ethylenically unsaturated groups of the resins Z are conjugated ethylenically unsaturated groups.

Preferably, the ethylenically unsaturated groups of the resins A are conjugated ethylenically unsaturated groups.

In a preferred embodiment, group ii. of the resin component Z comprises acrylic ester, methacrylic ester or mixtures thereof.

In a preferred embodiment, group iii. of the resin component Z comprises the esters groups of fumaric acid, maleic acid, maleic anhydride, itaconic acid, citraconic acid or mixtures thereof.

In another preferred embodiment, the resin component Z is obtainable as a reaction product of an epoxy resin and a compound having one carboxylic acid group and one ethylenically unsaturated group.

In a preferred embodiment, the resin component Z is obtainable as a reaction product of an epoxy resin, a compound having one carboxylic acid group and one ethylenically unsaturated group and a compound comprising a) two carboxylic acid groups or a carboxylic acid anhydride group and b) one ethylenically unsaturated group.

In a preferred embodiment, the epoxy resin further comprises bisphenol A, bisphenol F or mixtures thereof.

In a preferred embodiment, the compound having one carboxylic acid group and one ethylenically unsaturated group is selected from acrylic acid, methacrylic acid and mixtures thereof.

In a preferred embodiment, the compound comprising a) two carboxylic acid groups or a carboxylic acid anhydride group and b) one ethylenically unsaturated group is selected from fumaric acid, maleic acid, maleic anhydride, itaconic acid, itaconic anhydride, citraconic acid, citraconic anhydride, and mixtures thereof.

Within the meaning of the invention, the resin components A and Z are preferably essentially free of epoxy groups.

Essentially free of epoxy groups also encompasses free of epoxy groups and it means that the epoxy equivalent weight of the material is at least 2000 g/eq, preferably of at least 3000 g/eq, more preferably at least 4000 g/eq, most preferably at least 5000 g/eq.

Commercially available epoxy resins can be used within the scope of this invention.

In another embodiment, the invention relates to a process for preparing the tape according to the invention, comprising the steps of:

x. providing a material comprising mica, a solid support and a resin component Z as defined above;

y. bonding the material comprising mica and the solid support with the resin component Z.

The invention further relates to the use of the resin component Z as defined above in the production of a tape, preferably of a mica tape.

Within the meaning of the invention, a preferred solid support includes a film, a paper, a non-woven fabric, or a woven fabric. Further solid support can be selected from woven and nonwoven glass cloth, nonwoven polyester web, foils, fiber cloth, preferably foils comprising polyethylene terephthalate or polyimide, solid films, preferably solid films comprising polyethylene. Examples of solid support include cellulosic paper, polymeric film, woven textile, non-woven structure, aramid paper and metal foil.

Within the meaning of this invention, suitable fibres for the tape of the invention are fibres used in the production of composite materials. Preferred fibres are selected from carbon fibers, glass fibers, natural fibres and synthetic fibers, such as polyethylene terephthalate fibres. More preferred are glass fibres and polyethylene terephthalate fibres.

Within the meaning of the invention, the material comprising mica or the layer comprising mica, also comprises mica papers or comprise at least one mica paper.

Mica papers means a paper containing the inorganic material mica, preferably having a mica content of at least 45% by weight, more preferably at least 70% by weight of mica.

The term mica is used in conventional meaning directed to form of a silicate mineral. Mica particles, normally in the form of a flake of various type, such as muscovite or phlogophite or blends thereof can be used.

In some embodiments, the mica paper further includes cellulose, acetate, acrylic, polyolefin, polyamide, polyester fiber, glass fiber, rock wool, polycrystal fiber like alumina, monocrystal like potassium titanate, or mixtures thereof.

Aramid means aromatic polyamides wherein at least 85% by weight of the amide linkages are attached directly to two aromatic rings.

The term fiber means very small, non granular, fibrous or film-like particles with at least one of their three dimensions being of minor magnitude relative to the largest dimension.

The mica paper can be made from a plurality of thin planner webs attached together. The mica paper can be made on a paper-making machine by providing the desired amount and proportion of mica and/or aramid solids to the headbox and then wetting as a web onto a paper making wire. The wet web can then be dried on dryer drums to form a paper.

In a preferred embodiment, the composition for impregnating and/or coating comprising resin A can be included in the mica paper, i.e., it can be used in the preparation of the mica paper.

In another embodiment, the invention relates to a substrate comprising a metal and comprising the tape of the invention. The substrate comprising a metal is an electrical conductor. The metal could be copper, aluminum, iron, gold or other alloys used in electromechanical devices.

The substrate is not limited to only a bar comprising a metal, but it is also understood to include one or more electrical conductors, e.g. wires or coils, wherein the wire or coils may be precoated or not. The electrical conductors or the substrates may be at least partially coated on the metal surface or other materials may be applied on the metal surface, or even another form of insulation, such as a tape as described before, may be applied on an electrical conductor or substrate. Optionally, the substrate comprising a metal is wrapped with a mica tape for dielectric breakdown protection. The mica tape is most effective for dielectric breakdown protection when the air voids and moisture is replaced with an impregnating material, i.e., the composition of the invention, by a vacuum pressure impregnation procedure.

In another embodiment, the invention relates to the use of the tape of the invention for electrical insulation, preferably in an electric machine.

In a further embodiment, the invention relates to a process for producing the resin component Z as defined above comprising the steps of:

a. Providing an epoxy resin and a compound comprising one ethylenically unsaturated group and one carboxylic acid group and a catalyst in the reactor, optionally in the presence of one or more inhibitors of a radical polymerization, obtaining a mixture;
b. reacting the mixture of step a. to obtain a first reaction product until the acid value of the first reaction product is less than 60 mg KOH/g;
c. Removing the reaction product out of the reactor.

In a preferred embodiment of the invention, the process for producing the resin component Z as defined above further comprises, after step b. and before step c., the steps of b1. adding to the mixture a compound comprising one ethylenically unsaturated group and two carboxylic acid groups; and b2. reacting the mixture of step a. to obtain a second reaction product until the acid value of the second reaction product is less than 60 mg KOH/g.

In a further preferred embodiment, resin Z and resin A can have the same or different acid number. Preferably the acid number is at most 60 mgKOH/g. In some embodiment, the acid number is at most 50 mgKOH/g. Preferably, the acid number is at most 40 mgKOH/g, more preferably the acid number is at most 30 mgKOH/g, most preferably the acid number is at most 20 mgKOH/g.

In some embodiments, resin Z and resin A can have the same or different acid number. Preferably, the acid number is in the range of 0 and 60 mgKOH/g, preferably the acid number is in the range of 1 and 60 mgKOH/g. Preferably, the acid number is in the range of 0 and 50 mgKOH/g, preferably the an acid number is in the range of 1 and 50 mgKOH/g, preferably the acid number is in the range of 0 and 40 mgKOH/g, preferably the acid number is in the range of 1 and 40 mgKOH/g, more preferably the acid number is in the range of 0 and 30 mgKOH/g, the acid number is in the range of 1 and 30 mgKOH/g, most preferably the acid number is in the range of 0 and 20 mgKOH/g, preferably the acid number is in the range of 1 and 20 mgKOH/g.

The advantage of the lower acid number is the better solubility in the monomer. In a further preferred embodiment of the process for preparing resin A or resin Z, the acid number of the first reaction product of the corresponding resin and the acid number of the second reaction product of the corresponding resin can be the same or different and is at most 60 mgKOH/g, preferably it is at most 50 mgKOH/g, preferably it is at most 40 mgKOH/g, more preferably it is at most 30 mgKOH/g, most preferably it is at most 20 mgKOH/g.

The ranges defined above for the acid numbers of the resin components A and/or Z also apply for the reaction products of the process.

In a preferred embodiment of the invention, the process further comprises the step of diluting and/or solvating the second reaction product with a diluent, a solvent and mixtures thereof.

Solvents encompass volatile diluents which evaporate e.g. organic solvents having a boiling point at atmospheric pressure of 280° C. or lower, as well as non-volatile diluents which do not evaporate and essentially remain in the tape.

In some embodiments, reactive diluents which participate in the curing or crosslinking reactions of the resin(s) may be present.

Non-limiting examples of diluents or solvents are acetone, ethyl acetate, methyl ethyl ketone and methyl isobutyl ketone (MIBK).

In another embodiment, the invention relates to a process for preparing a treated substrate comprising the tape of the invention, comprising the steps of:

Wrapping the tape of the invention on a substrate comprising a metal obtaining a wrapped substrate;

Coating and/or impregnating the wrapped substrate with a coating and/or impregnating composition to obtain a wrapped and coated and/or impregnated substrate;

curing the wrapped and coated and/or impregnated substrate obtaining a treated substrate.

A further advantage of the present invention is that the resin component used in the tape can be combined with a compatible resin used for impregnating and/or coating a substrate comprising the tape.

Within the meaning of the invention, a compatible resin and/or a composition comprising a compatible resin used in the process for preparing a treated substrate comprising the tape is preferably selected from a resin based on polyester, an epoxy based resin, resin comprising ester and ethylenically unsaturated units, such as resin A, or polyesterimide.

The resin and/or resin compositions used in the process for preparing a treated substrate are also indicated as resin and/or resin composition for impregnating and/or coating a substrate.

In a preferred embodiment, the composition used in the process for preparing a treated substrate comprises:

A) A resin component comprising:
   i. One or more, the same or different, groups of formula

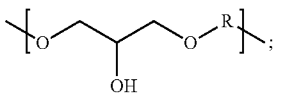

wherein R is an organic group comprising 2 to 40 carbon atoms;
   ii. One or more groups comprising two ester groups and one ethylenically unsaturated group;
   iii. One or more terminal or pendant groups comprising one ester group and one ethylenically unsaturated group;

B) at least one reactive diluent having at least one ethylenically unsaturated polymerizable group and having a boiling point at atmospheric pressure higher than 200° C.; and C) an initiator for radical polymerization; obtaining a coated and/or impregnated substrate;

curing the wrapped and coated and/or impregnated substrate obtaining a treated substrate.

In another embodiment, the invention relates to a treated substrate comprising the tape of the invention obtainable by any one of the processes for preparing a treated substrate.

In a preferred embodiment, the invention relates to the use of the tape of the invention for electrical insulation, preferably in an electric machine, further comprising the use of a composition for impregnating and/or coating a substrate comprising the tape of the invention.

Within the meaning of the invention, preferably the composition for impregnating and/or coating a substrate comprising the tape of the invention comprises:

A) A resin component comprising:

i. One or more, the same or different, groups of formula

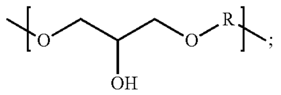

wherein R is an organic group comprising 2 to 40 carbon atoms;

ii. One or more groups comprising two ester groups and one ethylenically unsaturated group;

iii. One or more terminal or pendant groups comprising one ester group and one ethylenically unsaturated group;

B) at least one reactive diluent having at least one ethylenically unsaturated polymerizable group and having a boiling point at atmospheric pressure higher than 200° C.; and C) an initiator for radical polymerization.

In another embodiment, the invention relates to the use of the tape of the invention for electrical insulation, preferably in an electric machine, further comprising the use of a composition, preferably used in the coating and/or impregnating a substrate, comprising A) A resin component comprising:

i. One or more, the same or different, groups of formula

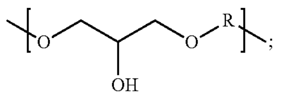

wherein R is an organic group comprising 2 to 40 carbon atoms;

ii. One or more groups comprising two ester groups and one ethylenically unsaturated group;

iii. One or more terminal or pendant groups comprising one ester group and one ethylenically unsaturated group;

B) at least one reactive diluent having at least one ethylenically unsaturated polymerizable group and having a boiling point at atmospheric pressure higher than 200° C.; and C) an initiator for radical polymerization.

In a further preferred embodiment of the invention, in the composition for impregnating and/or coating a substrate comprising the tape of the invention, the resin component A is a reaction product of A1) an epoxy resin;

A2) a compound comprising a) two carboxylic acid groups or a carboxylic acid anhydride group and b) one ethylenically unsaturated group, and A3) a compound having one carboxylic acid group and one ethylenically unsaturated group.

In a further preferred embodiment of the invention, the epoxy resin of component A1 further comprises bisphenol A and/or F units.

In a further preferred embodiment of the invention, component A3) is selected from acrylic acid, methacrylic acid and mixtures thereof.

In a further preferred embodiment of the invention, component A2 is selected from fumaric acid, maleic acid, maleic anhydride, itaconic acid, itaconic anhydride, citraconic acid, citraconic anhydride, and mixtures thereof.

In a further preferred embodiment of the invention, component A of the composition for impregnating and/or coating a substrate has an acid number of at most 20 mgKOH/g.

In some embodiments, the component A consists essentially of i. One or more, the same or different, groups of formula

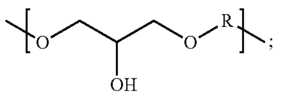

wherein R is an organic group comprising 2 to 40 carbon atoms ii. one or more groups comprising two ester groups and one ethylenically unsaturated group;

iii. One or more terminal or pendant groups comprising one ester group and one ethylenically unsaturated group.

In some embodiments, the component A consists of 90% by weight, preferably 95% by weight, more preferably 98% by weight of the groups i), ii) and iii) present in the resin component A calculated on the total weight of the component A.

In a further preferred embodiment of the invention, the composition for impregnating and/or coating a substrate comprises at most 3% by weight of styrene or vinyl toluene reactive diluents calculated on the total weight of the composition.

In a further preferred embodiment, the composition for impregnating and/or coating a substrate is essentially free of epoxy groups.

In a further preferred embodiment, component B of the composition for impregnating and/or coating a substrate is liquid at a temperature of 25° C.

In a further preferred embodiment, any composition for impregnating and/or coating a substrate has a viscosity in the range of 50 to 450 mPa*s at a temperature of 25° C.

In a further preferred embodiment, the composition for impregnating and/or coating a substrate has a viscosity in the range of 100 to 450 mPa*s at a temperature of 25° C., most preferably in the range of 150 to 450 mPa*s at a temperature of 25° C.

In another embodiment, the invention relates to a process for preparing treated substrate comprising the tape of the invention, comprising the steps of:

a. Providing the composition for impregnating and/or coating a substrate comprising the tape of the invention;

b. Applying the composition for impregnating and/or coating a substrate comprising the tape of the invention to the substrate; and c. Polymerizing the composition.

Within the meaning of the invention, curing the composition means polymerizing the composition. In fact, in this step the ethylenically unsaturated groups of the resins used in the tape and/or in the composition for impregnating and/or coating a substrate are polymerized at a suitable temperature to achieve a radical polymerization in the presence of a catalyst suitable for a radical polymerization, such as a peroxide.

In another embodiment, the invention relates to a treated substrate comprising the tape of the invention obtainable by the process for preparing a treated substrate. In another embodiment, the invention relates to the use of the treated substrate comprising the tape of the invention for electrical insulation.

Within the meaning of the invention, in the composition for coating and/or impregnating a substrate comprising the tape of the invention, reactive diluents are used. Reactive diluents are diluents having at least an ethylenically unsaturated polymerizable group with a boiling point higher than 200° C. Non-limiting examples of reactive diluents include vinyl ethers, acrylates, methacrylates, allyl groups, alkenes (also vinyl groups).

Preferably, the reactive diluents of the invention have at least two ethylenically unsaturated polymerizable groups. Most preferably, the reactive diluents of the invention have two ethylenically unsaturated polymerizable groups.

Most preferred reactive diluents are diallylfumarate (DAF), tetraethylene glycol di(meth)acrylate (TEGDMA), hexanediol di(meth)acrylate (HDDMA) or butanediol dimethacrylate), or mixtures thereof.

Within the meaning of the invention epoxy resins or epoxy based resins are those resins bearing at least one an epoxy group, preferably at least two epoxy groups per molecule. Preferred epoxy resins further to the epoxy group comprise a bisphenol A or a bisphenol F or comprise a mixture of bisphenol A and F.

In a preferred embodiment, the composition is essentially free of epoxy groups.

An initiator for a radical polymerization within the meaning of the invention is a compound suitable for starting a radical polymerization. Preferred initiators of a radical polymerization are peroxides. More preferred are dicumyl peroxide.

Within the meaning of the invention, applying the composition of the invention on a substrate means that the substrate can be coated and/or impregnated with the composition of the invention.

A coating is a covering that is applied to the surface of a substrate, wherein the coating itself may be an all-over coating, i.e., completely covering the substrate, or it may only cover parts of the substrate.

A substrate is impregnated when it, at least partially, absorbs a liquid, in this case, the composition for impregnating a substrate. This means that cavities or empty spaces present in the substrate are at least partially covered by the composition for impregnating a substrate.

EXAMPLES

Examples Al to Al 1

1. Preparation of the composition comprising resin component A.

The resins were synthesized using a glass reactor equipped with a water-cooled condenser. A combination of nitrogen and air was bubbled into the reactor. Bisphenol F and/or Bisphenol A type epoxy resin (EPON 824, 344 grams) and inhibitors were added to the reactor and agitation was turned on. Glacial acrylic or methacrylic acid (140 grams) and Ancamine K54 (0.6 grams) catalyst were then added into the vessel, and the reaction mixture was heated to 99° C. An exotherm was observed that increased the temperature of the reaction to around 121° C. The solution was then held at 104-110° C. until the acid value decreased to less than 20 mg of KOH per gram of the reaction product. The material was then cooled to less than 82° C., and maleic anhydride (22 grams) was added. The reaction temperature was then increased to 104.4-110° C. until an acid value of less than 20 mg of KOH per gram of reaction product was achieved. The reaction was then separated into multiple samples, which were allowed to cool to room temperature. The reaction product was then re-melted, additional inhibitors added, and thinned with an diallyl fumarate (DAF, 415 grams), tetraethylene glycol di-(meth)acrylate (TEGDMA, 507 grams), hexanediol di(meth)acrylate (HDDMA, 507 grams), or butanediol dimethacrylate (BDDMA, 507 grams) monomer until a viscosity of around 400 cP or less was obtained. The material was then cooled to below 49° C. and dicumyl peroxide (5-20 grams) was added. Finally, the material was filtered through a 25-micron cloth. The chemical composition is detailed in Table 1 for examples A1-A11.

TABLE 1

| EX | Resin Component A | Reactive Diluent | Dicumyl peroxide |
|---|---|---|---|
| A1 | Bis F Epoxy with Methacrylic Acid and Maleic Anhydride | 40% DAF | 0.50% |
| A2 | Bis F Epoxy with Methacrylic Acid and Maleic Anhydride | 50% TEGDMA | 0.50% |
| A3 | Bis F Epoxy with Methacrylic Acid and Maleic Anhydride | 50% HDDMA | 0.50% |
| A4 | Bis F Epoxy with Methacrylic Acid and Maleic Anhydride | 50% BDDMA | 0.50% |
| A5 | Bis F Epoxy with Methacrylic Acid and Maleic Anhydride | 50% BDDMA | 1.00% |
| A6 | Bis F Epoxy with Methacrylic Acid and Maleic Anhydride | 50% BDDMA | 2.00% |
| A7 | Bis F Epoxy with Acrylic Acid and Maleic Anhydride | 45% DAF | 0.50% |
| A8 | Bis F Epoxy with Acrylic Acid and Maleic Anhydride | 50% TEGDMA | 0.50% |
| A9 | Bis F Epoxy with Acrylic Acid and Maleic Anhydride | 50% HDDMA | 0.50% |
| A10 | Bis F Epoxy with Acrylic Acid and Maleic Anhydride | 50% BDDMA | 0.50% |
| A11 | Bis A Epoxy with Methacrylic Acid and Maleic Anhydride | 50% BDDMA | 0.50% |

EXAMPLES

Synthesis of the Resin Component Z

The resins were synthesized using a glass reactor equipped with a water-cooled condenser.

Resin Z1: A combination of nitrogen and air was bubbled into the reactor.

Bisphenol A epoxy resin (579 grams) and inhibitors were added to the reactor and agitation was turned on. Glacial methacrylic acid (203 grams) and Ancamine K54 (0.9 grams) catalyst were then added into the vessel, and the reaction mixture was heated to 99° C. An exotherm was observed that increased the temperature of the reaction to around 121° C. The solution was then held at 104-110° C. until the acid value decreased to less than 20 mg of KOH per gram of the reaction product. The material was then cooled to less than 82° C., and maleic anhydride (32 grams) was added. The reaction temperature was then increased to 104.4-110° C. until an acid value of less than 20 mg of KOH per gram of reaction product was achieved. The reaction was then diluted with methylethyl ketone (204 grams). Finally, the material was filtered through a 25-micron cloth.

Resin Z2:

A combination of nitrogen and air was bubbled into the reactor. Styrene (37 grams) was loaded into the reactor. Bisphenol A epoxy resin (Epon 1001, 55.55 grams) and inhibitors were added to the reactor and agitation was turned on. The mixture was heated to 60° C. and held until the epoxy had dissolved. The mixture was cooled to room temperature.

Glacial methacrylic acid (4.45 grams) and Ancamine K54 (0.06grams) catalyst were then added into the vessel, and the reaction mixture was heated to 101° C. over the course of 3.5 hours at which point the acid value was 0.6-1. An unknown amount of styrene was lost through the condenser.

When cooled, the material was solid.

GPC results: Mn 1701 g/mol; Mw 4132 g/mol; Mz 7671 g/mol; PD 2.42

Resin Z3:

A combination of nitrogen and air was bubbled into the reactor. Xylene (40 grams) was loaded into the reactor and agitation was turned on. Bisphenol A epoxy resin (Epon 1001, 55.55 grams) and inhibitors were added to the reactor. The mixture was heated to 66° C. and held until the epoxy was dissolved, about 4 hours. The mixture was cooled to room temperature.

Glacial methacrylic acid (4.45 grams) was added and the mixture was heated to 109° C. and held 7 hours. The acid value was 59 mgKOH/g. The mixture was cooled to room temperature.

Glacial methacrylic acid (4.45 grams) and benzyltriethylammonium chloride (0.3 grams) were added and the mixture was set for 104° C., but exothermed to 134° C. Heat was stopped, the mixture was poured off and cooled.

GPC results: Mn 1997 g/mol; Mw 4154 g/mol; Mz 12022 g/mol; PD 2.08

Resin Z4:

A combination of nitrogen and air was bubbled into the reactor. Xylene (957.3 grams) was loaded into the reactor and agitation was turned on. Bisphenol A epoxy resin (Epon 1009, 718 grams) was added and the mixture was heated to 135° C. After one hour the epoxy was largely dispersed, but not fully dissolved. Methylisobutylketone (231 grams) was added to improve solubility. Bisphenol A epoxy resin (Epon 1009, 718 grams) was added slowly and the mixture was held at 135° C. until dissolved. Inhibitors were added and the mixture was cooled to 104° C.

Glacial methacrylic acid (40.49 grams) and benzyltriethylammonium chloride (7.38 grams) were added And the mixture was held at 104° C. for about 4 hours until acid value was 6.7. Mixture was vacuumed and poured out of reactor to cool.

Tg by DSC: 82° C.

GPC results: Mn 4784 g/mol; Mw 15679 g/mol; Mz 40345 g/mol; PD 3.3

A sample of this material was crushed to powder and mixed with 1% dicumyl peroxide. It was evaluated by DSC. Cure onset 126° C. Peak max 169° C.

Joules/gram 32 Tg 70° C.

The material was ground with mortar & pestle and with an industrial blender. The powder was classified with sieves to produce a kilogram of powder that was Dv10 38.2 μ Dv50 134 μ Dv90 372 μ.

The powder was vacuumed for 6 hours to remove any residual solvent.

Measurements

GPC measurements were performed using Agilent Infinity 1260 GPC. The Infinity GPC is equipped with an Infinity 1260 Degasser. The Infinity GPC is equipped with an isocratic pump that is also model number Inifinity 1260. The serial number is DEAB902598. Next the Infinity GPC contains attachments for thermostating the GPC columns and autosampler features. The solvent is tetrahydrofuran (THF) and supplied by Honeywell. The purity is 99.9% with a peroxide level of less than 2 mg/L. Samples to be analyzed are first dissolved in THF with mild agitation. The samples is swirled clockwise for 39 revolutions. The sample is then placed on hot plate at 40° C. for 20 seconds. The sample is next swirled and additional 40 revolutions. Sample is analyzed for complete dissolution visually by chemist with suitable vision of 20/40 or better. If sample is not sufficiently dissolved, the sequence above is repeated until dissolution is complete. The sample is then filtered through a 5 mL syringe with a 0.5 micron filter filter housing. The solution is collected with a 5 mL vial suitable for the autosampler. A lid with a rubber septum is then crimped onto the vial using an Agilent supplied vial crimper. After all the samples have been loaded into the autosampler, the method is started. The method is set to a flow rate of 1 mL/min of THF through a mixed D column (2 in seriers) supplied by Phenomenex. The mixed D columns are thermostated at 40° C. and the refractive index detector is baseline zeroed. The effluent is collected in a suitable container with proper venting. Samples are injected on the column per the method with an injection volumn of 0.5 microliters per injection. The refractive index detector is thermostated at 40° C. also to prevent signal drift. The signal polarity is positive. The maximum pressure allowed on the column set is 600 bar. Analysis was performed with Agilent Chemstation software. Reference samples of polystyrene purchased from Agilent are run in a similar fashion to develop a calibration curve. The standards range in molecular weight of 500 to 30,000 daltons [g/mol]. The calibration curve can be a linear fit or first order or second order depending on the column set utilized. In this experiment we used a first order fit.

Acid Number

The acid number is the KOH quantity in mg that is required for neutralizing 1 g of substance under the defined conditions. The acid numbers were determined by a neutralization reaction with a 0.1 N KOH in Ethanol according to DIN EN ISO 2114.

General Procedure for the Preparation of the Samples

Mica glass fiber tapes, comprising the resin Z or a standard resin were wrapped on hollow steel bar, applying 8 half-lapped layers with 6 kg of tension; ends were sealed with a sealing product.

Then, a conductive tape was applied on external surface, to be used for dissipation factor measurement.

Bars were then closed with aluminum strips and thermal shrink tape as moulds.

These bars were impregnated using the composition of the invention comprising resin A or a standard impregnation resin with following Vacuum Process Impregnation (VPI) process:

Dry vacuum phase: 16 hours at 0.5 mbar and 50° C.

Impregnation resin degassed at 0.5 mbar and 45° C.

Impregnation resin flooding at 0.5 mbar and 50° C.
Wet vacuum phase: 1 hour at 0.5 mbar and 50° C.
Pressure stage: 6 hours at 6 bar abs. and 50° C.
Bars were then cured with following curing cycle:
Oven preheated at 140° C.
1 hour at 140° C.
From 140° C. to 160° C. in 2 hours
12 hours at 160° C.

After curing, moulds were removed and dissipation factor of these bars was measured applying voltage from 1 kV to 12 kV, 1 kV step. All bars had flat dissipation factor profile.

Bars were then tested in two different ways:

Fast ageing cycles: thermal ageing for 16 hours at increasing temperature, starting from 170° C. and increasing 10° C. each step; dissipation factor, measured after each step, stayed flat up to 220° C. cycle Long term aging: thermal ageing at 180° C. and 190° C., checking dissipation factor every 5 days; DF stayed flat for more than 100 days for both temperatures Long-Term Aging Test Comparative Example 1

The long-term aging tests were run for bars prepared according to the general procedure described above using an epoxy anhydride resin Epoxylite® 006-0611 as impregnation resin and a standard tape K3032 produced by Krempel which contains an epoxy based resin binder, as mica glass fiber tape.

Example 1

The long-term aging tests were run for bars impregnated with the composition of Example A11 and using a tape comprising the resin component Z of Example Z1.

Results of the Long-Term Aging Test

The bars of the Example 1 showed a constant dissipation factor for at least 130 days when aged at 190° C. In fact, the dissipation factor remains between 0.7 and 1 when the bars are aged at 190° C. for 130 days.

The bars of the Comparative Example show an increase of the dissipation factor from 0.7 to 1.2 after 15 days and to 1.7 after 20 days when measured in the same conditions of the Example 1.

The increase of the dissipation factor of the bars of the Comparative Example indicates a delamination of the insulation layer, which is no longer present in the bars of the Example of the Invention.

Fast Aging Cycle

Comparative Example 2

The fast aging cycle tests were run for bars prepared according to the general procedure described above using an epoxy resin Epoxylite® 006-0841 as impregnation resin and a standard tape K3015 produced by Krempel which contains an epoxy based resin binder, as mica glass fiber tape.

Example 2

The fast aging cycle tests were run for bars prepared according to the general procedure described above using the composition of Example A11 for impregnating the bars and using a tape comprising the resin component Z of Example Z1.

Results of the Fast Aging Cycles

The bars of the Comparative Example show an increase of the dissipation factor from 0.7 to 1.2 after the cycle at 210° C. and to 1.7 after 220° C.

The bars of the Example 2 show an increase of the dissipation factor to 2 after the cycle at 220° C.

The invention claimed is:

1. A tape consisting essentially of mica, a separate solid support and a resin component Z, the resin component Z comprising:

i. one or more, the same or different, groups of formula

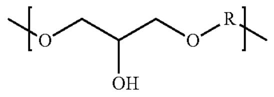

wherein R is an organic group comprising 2 to 40 carbon atoms; and ii. one or more groups comprising one ester group and one ethylenically unsaturated group; and iii. one or more groups comprising two ester groups and one ethylenically unsaturated group;

wherein the resin component Z has an acid value of not more than 25 mgKOH/g.

2. The tape of claim 1, wherein the resin component Z consists essentially of:

i. one or more, the same or different, groups of formula

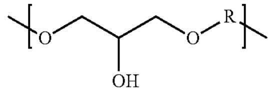

wherein R is an organic group comprising 2 to 40 carbon atoms;

ii. one or more groups comprising one ester group and one ethylenically unsaturated group; and iii. one or more groups comprising two ester groups and one ethylenically unsaturated group.

3. The tape of claim 1, wherein R comprises a hydrocarbon part of a bisphenol A unit or a bisphenol F unit.

4. The tape of claim 1, wherein the one or more groups ii. comprising one ester group and one ethylenically unsaturated group comprises one or more of an acrylic ester and a methacrylic ester.

5. The tape of claim 1, wherein the one or more groups iii. comprising two ester groups and one ethylenically unsaturated group comprises an ester group of one or more of fumaric acid, maleic acid, maleic anhydride, itaconic acid, and citraconic acid.

6. The tape of claim 1, wherein the resin component Z is obtained as a reaction product of an epoxy resin, a compound comprising one carboxylic acid group and one ethylenically unsaturated group, and a compound comprising a) two carboxylic acid groups or a carboxylic acid anhydride group, and b) one ethylenically unsaturated group.

7. The tape of claim 6, wherein the epoxy resin further comprises one or more of bisphenol A and bisphenol F.

8. A substrate comprising a metal and the tape of claim 1.

9. The tape of claim 1, wherein the acid value of the resin component Z is not more than 20 mgKOH/g.

10. A process for preparing a tape, the process comprising:

providing a material comprising mica, a separate solid support and a resin component Z, the resin component Z comprising:

i. one or more, the same or different, groups of formula

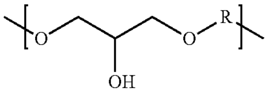

wherein R is an organic group comprising 2 to 40 carbon atoms; and ii. one or more groups comprising one ester group and one ethylenically unsaturated group;

iii. one or more groups comprising two ester groups and one ethylenically unsaturated group; and bonding the material comprising mica and the solid support with the resin component Z to form a tape consisting essentially of said mica, said separate solid support, and said resin component Z, wherein the resin component Z has an acid value of not more than 25 mgKOH/g.

11. The process of claim 10, wherein the resin component Z is obtained as a reaction product of an epoxy resin, a compound comprising one carboxylic acid group and one ethylenically unsaturated group, and a compound comprising a) two carboxylic acid groups or a carboxylic acid anhydride group, and b) one ethylenically unsaturated group.

12. The process of claim 10, wherein the acid value of the resin component Z is not more than 20 mgKOH/g.

13. A process for preparing a treated substrate, the process comprising:

wrapping a substrate comprising a metal with a tape to obtain a wrapped substrate, the tape consisting essentially of mica and a separate solid support;

one or more of coating and impregnating the wrapped substrate with a composition, the composition comprising:

A) a resin component comprising:

one or more, the same or different, groups of formula

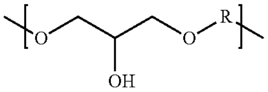

wherein R is an organic group comprising 2 to 40 carbon atoms;

ii. one or more groups comprising two ester groups and one ethylenically unsaturated group; and iii. one or more terminal or pendant groups comprising one ester group and one ethylenically unsaturated group;

B) at least one reactive diluent comprising at least one ethylenically unsaturated polymerizable group and having a boiling point at atmospheric pressure higher than 200° C.; and C) an initiator for radical polymerization; and curing the composition to form a cured resin composition;

wherein the cured resin composition has an acid value of not more than 25 mgKOH/g.

14. A treated substrate obtained by the process of claim 13.

15. The process of claim 13, wherein the resin component Z is obtained as a reaction product of an epoxy resin, a compound comprising one carboxylic acid group and one ethylenically unsaturated group, and a compound comprising a) two carboxylic acid groups or a carboxylic acid anhydride group, and b) one ethylenically unsaturated group.

16. The process of claim 13, wherein the acid value of the cured resin composition is not more than 20 mgKOH/g.

* * * * *